United States Patent
Tsuchiya

(10) Patent No.: US 10,862,616 B2
(45) Date of Patent: Dec. 8, 2020

(54) COMMUNICATION PROCESSING APPARATUS AND COMMUNICATION PROCESSING METHOD

(71) Applicant: YOKOGAWA ELECTRIC CORPORATION, Tokyo (JP)

(72) Inventor: Masanobu Tsuchiya, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 112 days.

(21) Appl. No.: 16/170,994

(22) Filed: Oct. 25, 2018

(65) Prior Publication Data

US 2019/0121666 A1   Apr. 25, 2019

(30) Foreign Application Priority Data

Oct. 25, 2017 (JP) ................. 2017-206551

(51) Int. Cl.
| | |
|---|---|
| *H04L 1/00* | (2006.01) |
| *G06F 9/48* | (2006.01) |
| *G06F 9/50* | (2006.01) |
| *G06F 9/54* | (2006.01) |

(52) U.S. Cl.
CPC .......... *H04L 1/0007* (2013.01); *G06F 9/4881* (2013.01); *G06F 9/5027* (2013.01); *G06F 9/542* (2013.01); *G06F 9/544* (2013.01)

(58) Field of Classification Search
CPC ...... G06F 9/4881; G06F 9/5027; G06F 9/542; G06F 9/544; H04L 1/0007
See application file for complete search history.

(56) References Cited

U.S. PATENT DOCUMENTS

| | | | |
|---|---|---|---|
| 2006/0153150 A1* | 7/2006 | Yang ................. | H04L 1/0007 370/338 |
| 2009/0097411 A1* | 4/2009 | Mizushima ......... | H04L 12/4035 370/252 |
| 2018/0225237 A1* | 8/2018 | Edirisooriya ........... | G06F 9/54 |

OTHER PUBLICATIONS

Demachi, K. et al., "Vnet/IP Real-Time Plant Network System" Yokogawa Technical Report, vol. 49, No. 2, 2005 (8 pages).

* cited by examiner

*Primary Examiner* — Jacob D Dascomb
(74) *Attorney, Agent, or Firm* — Osha Bergman Watanabe & Burton LLP

(57) ABSTRACT

A communication processing apparatus includes: an application unit that causes application software to be executed; and a real-time communication unit that receives communication requests from the application software and performs transmission and reception of data based on the communication requests. The real time unit includes: a request buffer that temporarily stores the communication requests received from the application software; a real-time communication-unit interface unit that, when the communication requests are data transmission requests, extracts the data transmission requests from the request buffer and performs transmission processing; and a self-diagnostic unit that detects a diagnostic index related to processing of the real-time communication unit, and transmits a notification of operation status of the real-time communication unit to the real-time communication-unit interface unit when the diagnostic index is within a predetermined range.

9 Claims, 8 Drawing Sheets

COMMUNICATION PROCESSING APPARATUS AND COMMUNICATION PROCESSING METHOD

CROSS-REFERENCE TO RELATED APPLICATIONS

The present application claims benefit of priority to Japanese Patent Application No. 2017-206551, filed on Oct. 25, 2017, the content of which is incorporated herein by reference in its entirety.

TECHNICAL FIELD

The present invention relates to a communication processing apparatus, a program, and a communication processing method.

BACKGROUND

In process control systems and so on, real-time performance in communication is specifically required. Mechanisms which use standard communication technologies called Ethernet and IP (Internet protocol) and perform real-time communication thereon have been constructed as technologies of the related art.

In a technology disclosed in Non-Patent Literature 1 (Koji Demachi and three others, "Real-Time Plant Network System Vnet/IP", Yokogawa technical report, Vol. 49, No. 2, 2005), in order to implement real-time performance, assignment of time slots to transmitter stations, and so on have been devised to prevent packet loss. Also, according to the technology disclosed in Non-Patent Literature 1, a network can be configured with multi-vendor devices, using an open standard protocol (see FIG. 4 and so on of Non-Patent Literature 1).

There are requests to implement devices to constitute networks of network systems for the purposes of plant control and so on, using more general-purpose products. In the case of incorporating general-purpose products in such devices while ensuring real-time performance, it is possible to expect reduction in the costs of devices and stabilization of supply of devices. One of such elements is OSs (Operating Systems). For example, it can be considered to use a computer as a communication processing apparatus for performing real-time communication and use a general-purpose OS for controlling functions (programs) which are executed on that computer. Here, in a system, real-time performance is performance capable of completing predetermined processing and so on within set times, and is performance ensuring that the corresponding processing and so on will be completed within the set times. More specifically, real-time performance includes performance capable of completing processing in the system within set times, and performance for obtaining responses from the outside of the system within set times. Also, real-time performance may include performance capable of detecting events in which processing or the like has not been completed within a set time and forcedly ending the processing or the like.

However, general-purpose OSs have the following problem. The problem is that schedulers of OSs for assigning the CPU time to a plurality of programs to be executed in parallel at the same time are not necessarily suitable for communication processing apparatuses. More specifically, for example, when scheduling a function of performing processing for plant control (referred to as an "application" for the sake of convenience) and a function of managing communication requests from that application (referred to as a "real-time communication unit" for the sake of convenience), the schedulers of general-purpose OSs may not perform appropriate allocation of computational resources. In the case of configuring a communication processing apparatus with applications (a plurality of applications may be executed in parallel on one communication processing apparatus at the same time) and a real-time communication unit as described above, in scheduling, the priority of the real-time communication unit is set to be higher than the priorities of the applications. In other words, in order to secure real-time performance, even though the processing capability of the applications is sacrificed, sufficient computational resources should be allocated to the real-time communication unit. However, the scheduler of a certain general-purpose OS operates by a logic in which if the CPU usage rate of tasks having high priorities exceeds a predetermined reference, in order to assign computational resources to tasks having relatively low priorities, assignment of computational resources to the tasks having high priorities is prohibited. In this case, the real-time communication unit which should advance processing with sufficient computational resources cannot sufficiently perform processing. As a result, an event in which the real-time performance of the communication processing apparatus in processing is impaired may occur.

SUMMARY

One or more embodiments of the present invention provide a communication processing apparatus, a program, and a communication processing method capable of securing real-time performance by assigning necessary computational resources to a real-time communication unit for processing communication requests, which are received from applications in a process control system, in real time while using the scheduler of a general-purpose OS.

One or more embodiments of the present invention provide a communication processing apparatus, a program, and a communication processing method having a communication function which does not need to use a device driver to access a real-time communication unit, and can be implemented without always assigning CPU cores, and is usable even in the case where a virtualizing unit is proprietary software.

According to one or more embodiments, a communication processing apparatus that performs communication processing in a process control system includes: an application unit configured to cause application software to be executed; and a real-time communication unit configured to receive communication requests from the application software and perform transmission and reception of data based on the communication requests. And the real-time communication unit includes: a request buffer configured to at least temporarily store the communication requests received from the application software; a real-time communication-unit interface unit configured, in a case where the communication requests are data transmission requests, to extract the data transmission requests from the request buffer and to perform transmission processing; and a self-diagnostic unit configured to detect a diagnostic index related to processing of the real-time communication unit, and to transmit a notification of operation status of the real-time communication unit to the real-time communication-unit interface unit in a case where the diagnostic index is within a predetermined range. And the real-time communication-unit interface unit is configured to adjust time intervals for extracting the data transmission requests from the request buffer, in a case where the real-time communication-unit interface unit received the notification of the operation status from the self-diagnostic unit.

DETAILED DESCRIPTION

Now, with reference to the drawings, embodiments of the present invention will be described.

Figure 1:
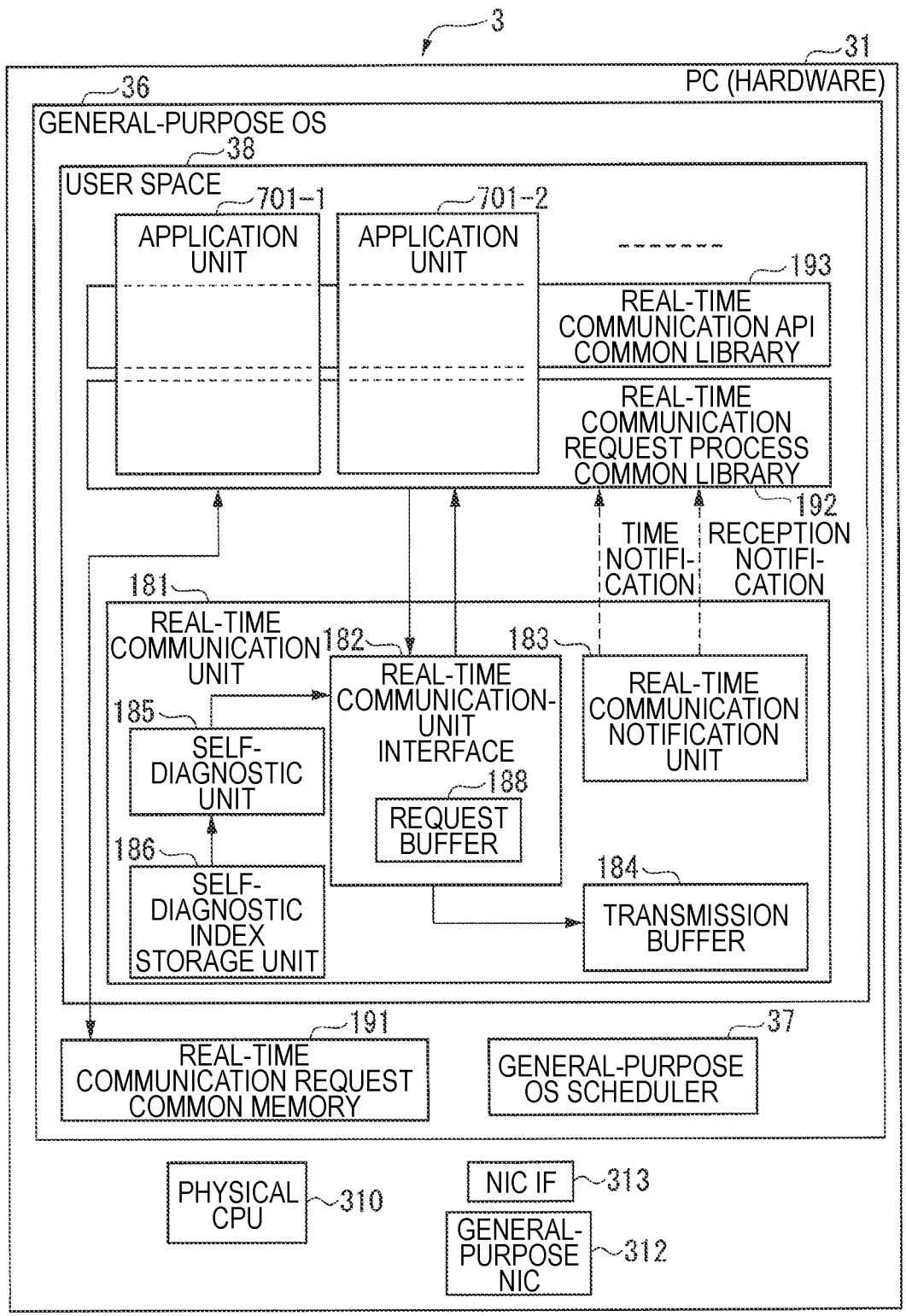
FIG. 1 is a block diagram illustrating a rough functional configuration of a communication processing apparatus according to one or more embodiments of the present invention.

FIG. 1 is a block diagram illustrating a rough functional configuration of a communication processing apparatus 3 according to one or more embodiments. The communication processing apparatus 3 according to one or more embodiments is configured on a PC 31. The PC 31 (hardware) includes a physical CPU 310, a physical NIC 312, and an NIC interface 313. Also, the PC 31 includes other components (not shown in the drawings) such as a memory and so on. PC is the abbreviation for "personal computer". CPU is the abbreviation for "central processing unit". NIC is the abbreviation for network interface card. An NIC is also referred to simply as a "network card". Also, an interface is also referred to simply as an "IF".

On the PC 31, a general-purpose OS 36 is executed. OS is the abbreviation for "operating system". By configuring a communication processing apparatus 3 using the general-purpose OS 36, it becomes possible to reduce the cost of the communication processing apparatus 3, and steadily supply the communication processing apparatus 3. As an example of the general-purpose OS 36, an OS based on Windows (registered as a trade mark) which is an OS for PCs made by Microsoft Corporation (the United States) can be used.

The physical CPU 310 is for sequentially fetching and executing commands included in programs loaded in a memory. The physical CPU 310 may include a plurality of cores. Also, the PC 31 may be configured to include a plurality of physical CPUs 310. The CPU time of the physical CPU 310 is assigned to individual functions in a user space 38.

The physical NIC 312 is an NIC having an interface function usable when individual functions in the PC 31 perform communication via an external network.

The NIC interface 313 is an interface having a function of mediating the physical NIC 312 and functions which are executed in the user space 38.

The general-purpose OS 36 includes a general-purpose OS scheduler 37. In the user space 38 which the general-purpose OS 36 manages, various functions can be executed in parallel at the same time. The general-purpose OS scheduler 37 appropriately assigns a computational resource according to the priorities of individual functions to be executed in the user space 38, thereby managing execution of those functions. Here, the computational resource is typically the CPU time (the CPU resource, i.e. the central-processing-unit resource). Also, resources other than the CPU time may be included as computational resources. Examples of computational resources include a memory which is assigned, input/output processing means, and so on. The general-purpose OS scheduler 37 may not a real-time scheduler. Also, although FIG. 1 shows only one user space 38, the general-purpose OS scheduler 37 may manage a plurality of user spaces 38.

Also, the general-purpose OS 36 includes a real-time communication request common memory 191.

The real-time communication request common memory 191 is a memory accessible from every task which is executed in the user space 38. In the real-time communication request common memory 191, a buffer usable when a real-time communication request process common library 192 (to be described below) temporarily stores various information such as communication requests coming from application units 701 is provided. As a function of the general-purpose OS 36, a memory space which can be shared by tasks can be provided. In one or more embodiments, the real-time communication request common memory 191 is provided outside the user space; however, it is mapped to predetermined areas in the memory spaces of the application units 701. As a result, the application units 701 can access the real-time communication request common memory 191.

The user space 38 is an environment in which the functions of a real-time communication unit 181 and the application units 701-1, 701-2, . . . are executed. The application units 701 execute the functions of the real-time communication request process common library 192 and a real-time communication API common library 193 (API is the abbreviation for "application programming interface"). The functions of the real-time communication request process common library 192 and the real-time communication API common library 193 are appropriately linked with application logics. The application units 701, the real-time communication request process common library 192, the real-time communication API common library 193, the real-time communication unit 181, and so on which are included in the user space 38 can be implemented using programs and a memory. These programs are executed by the CPU which is appropriately assigned by the general-purpose OS scheduler 37. Also, the memory is implemented using, for example, a semiconductor, a magnetic recording medium, or the like. However, the functions which are executed in the user space 38 may not necessarily need to have memories. On the contrary, functions which just store information and do not have processing to be executed do not need to have programs. The application units 701-1, 701-2, . . . will be also referred to simply as the "application units 701".

The real-time communication request process common library 192 is not a library which is incorporated as a device driver in a kernel space, and is executed in the user space 38. However, the function of the real-time communication request process common library 192 (a program) may be statically linked to a program of application software (namely, an application program), or the function of the real-time communication request process common library 192 may be executed as an independent task.

The real-time communication request process common library 192 has the functions of a real-time communication request reception logic, a real-time communication transmission logic, and a real-time communication reception logic (all of which are not shown in the drawings) therein.

The real-time communication request reception logic included in the real-time communication request process common library 192 receives real-time communication requests coming from the individual application logics such as the application units 701-1, 701-2, and so on via the real-time communication API common library 193. Further, the real-time communication request reception logic collects the received requests, and writes transmission frames and so on associated with the requests (for example, transmission requests) in a buffer according to the priorities of the transmission requests. This buffer exits inside the real-time communication request common memory 191. If storing transmission frames in the buffer included in the real-time communication request common memory 191, the real-time communication request reception logic notifies it to a real-time communication transmission request process logic included in the real-time communication request process common library 192.

If the real-time communication transmission logic included in the real-time communication request process common library 192 receives the notification from the real-time communication request reception logic, it takes the transmission frames from the buffer included in the real-time communication request common memory 191, and transmits the transmission frames to the real-time communication unit 181. Specifically, the real-time communication transmission logic performs the transmission by writing the transmission frames in a request buffer 188 included in a real-time communication-unit interface 182 (a real-time communication-unit interface) included in the real-time communication unit 181. Also, the reason why the real-time communication request reception logic collects requests and stores them in the buffer included in the real-time communication request common memory 191 is to arrange the requests of individual applications according to the request contents and the priorities of transmission requests before transmitting them to the real-time communication unit 181.

If the real-time communication reception logic included in the real-time communication request process common library 192 receives a reception notification from a real-time communication notification unit 183 included in the real-time communication unit 181, it receives the frames received from the outside, and writes the frames in the buffer included in the real-time communication request common memory 191. Also, the real-time communication reception logic notifies the real-time communication request reception logic that it has received the frames.

The real-time communication request reception logic takes the received frames from the buffer included in the real-time communication request common memory 191, on the basis of the notification received from the real-time communication reception logic, and returns the received frames to the application units 701 which issued the received request.

Also, the real-time communication request process common library 192, the real-time communication transmission logic, and a real-time communication reception process logic correspond to functions which have been implemented by device drivers based on the network driver interface specification (NDIS) of Windows made by Microsoft Corporation in the related art. In the related art, the NDIS has been executed in kernel spaces. The function of the real-time communication request process common library 192 of one or more embodiments is executed in the user space.

The real-time communication API common library 193 is a common library including an API usable when the application units 701 perform real-time communication. The application units 701 may be statically linked to and use the function of the real-time communication API common library 193. Alternatively, when the application units 701 are executed, they may be dynamically linked to the function of the real-time communication API common library 193.

The application units 701-1, 701-2, and so on are for performing processing to control, for example, plants and devices. The application units 701 cause, for example, an HMI (human-machine interface) for performing display of measurement data of the plant and operations on the plant, an ENG (engineering server) in which a control program of a controller for controlling the plant is created, a gateway, and software related to applications called a controller and the like for controlling the plant to run. A plurality of application units 701 may be executed in parallel at the same time. In one or more embodiments, the application units 701 first store communication requests in the real-time communication request common memory 191 which is a storage unit shared by the plurality of application units 701, and then transmit the communication requests taken from the real-time communication request common memory 191, to the real-time communication unit 181. The number of pieces of application software (namely, the number of application programs) which are executed in the user space 38 is arbitrary. Requests which the application units 701 issue to the real-time communication unit 181 are establishment or release of a logical communication channel, transmission of reception of frames (which are also referred to as packets and the like and are logical units in transmitting and receiving data), and so on.

The real-time communication unit 181 is a unit having a function of performing communication in real time on the basis of communication requests from the application units 701 and so on. Specifically, the real-time communication unit 181 receives communication requests from the application units 701 and so on, and performs transmission and reception of data on the basis of the communication requests. In the processing which the real-time communication unit 181 performs, naturally, the timings of frame transmission, frame reception, and so on need to be matched with those a controller 801 and a PC 802. Therefore, real-time performance is required. Here, real-time performance is performance capable of completing requests which the real-time communication unit 181 issue to the controller 801 or the PC 802, within predetermined times. Also, real-time performance is performance capable of sending responses to requests to the real-time communication unit 181 within predetermined times set for the requests even though the requests are not completed within the predetermined times (for example, an error or the like may be notified). Here, predetermined times depend on applications, and are times, for example, in a range from several milliseconds to several hundred milliseconds. Also, the real-time communication unit 181 is executed as a task independent from the application units 701.

Therefore, communication which the real-time communication unit 181 performs with other devices is performed without delay. In other words, the real-time communication unit 181 can surely receive an acknowledgement (Ack) from the other party which is the destination of transmission. Also, diagnosis communication for notifying the existence of the corresponding device (the communication processing apparatus) to other devices is performed without delay. Since diagnosis communication is surely performed, the existence of the corresponding device can be correctly recognized from other devices. Therefore, in the system, harmful effects of communication problems of the corresponding device on other devices do not occur.

The physical CPU 310 included in the PC 31 is assigned to the application units 701 and the real-time communication unit 181.

Also, in the general-purpose OS 36, task priorities higher than the priorities of tasks of the application units 701 are assigned to tasks of the real-time communication unit 181. In other words, since the general-purpose OS scheduler 37 preferentially assigns the computational resources to the real-time communication unit 181, the real-time communication unit 181 is executed in preference to other functional units (for example, the application units 701) which are executed in parallel at the same time.

Task priorities are guides for instructing the general-purpose OS scheduler 37 to assign the computational resources to the real-time communication unit 181 in preference to the application units 701. Task priorities are generally numbers representing the order of priority (whether to represent higher priorities by larger numbers or smaller numbers depends on the general-purpose OS which is installed); however, task priorities are not limited to numbers, and the general-purpose OS scheduler may designate the priorities of scheduling algorithms to be preferentially processed.

Also, the method of setting priorities which are disclosed in one or more embodiments is not limited thereto, and any other setting method may be used.

The internal functional configuration of the real-time communication unit 181 is as follows. The real-time communication unit 181 is configured to include the real-time communication-unit interface 182, the real-time communication notification unit 183, a transmission buffer 184, a self-diagnostic unit 185, and a self-diagnostic index storage unit 186. Also, the real-time communication-unit interface 182 includes the request buffer 188 therein. The functions of the individual functional units listed above are as follow.

The real-time communication-unit interface 182 is included in the real-time communication unit 181, and has a function of receiving requests from the application units 701 and sending responses to the requests to the application units 701. In the case where a received communication request is a data transmission request, the real-time communication-unit interface 182 takes the transmission request from the request buffer 188, and performs transmission processing. Also, if the real-time communication-unit interface 182 receives an operation status notification (a notification of an unstable operation) from the self-diagnostic unit 185, it adjusts the time intervals for taking transmission requests from the request buffer 188. Specifically, if receiving a notification of an unstable operation, the real-time communication-unit interface 182 delays timings to take transmission requests from the request buffer 188 as compared to the case where it does not receive the corresponding notification. As an example, the real-time communication-unit interface 182 waits for a predetermined time before taking transmission requests from the request buffer 188. Also, if the real-time communication-unit interface 182 consecutively receives operation status notifications from the self-diagnostic unit 185 for a predetermined time, it further adjusts the time intervals for taking transmission requests from the request buffer 188 as compared to the case where it does not consecutively receive notifications for the predetermined time. As an example, the real-time communication-unit interface 182 further adjusts the time intervals for taking transmission requests from the request buffer 188. Specifically, if consecutively receiving such notifications for the predetermined time, the real-time communication-unit interface further increases the waiting time as compared to the case where it does not consecutively receive notifications for the predetermined time. The real-time communication-unit interface 182 performs communication with the application units 701 via the real-time communication API common library 193 and the real-time communication request process common library 192. As described above, the real-time communication-unit interface 182 is a receiving unit for receiving transmission requests from the application units 701. Also, if receiving a notification representing that an unstable operation has occurred in the real-time communication unit 181 from the self-diagnostic unit 185, the real-time communication-unit interface 182 temporarily delays processing on transmission frames coming from the application units 701. In other words, the real-time communication-unit interface 182 performs control such that transmission requests which are input from the application units 701 to the request buffer 188 do not excessively flow into the transmission buffer 184. In other words, even if the request buffer 188 receives a lot of transmission requests, the real-time communication-unit interface 182 does not process those transmission requests immediately. Therefore, in a situation where an unstable operation has occurred in the real-time communication unit 181, the real-time communication-unit interface 182 has the effect of relieving the unstableness.

The real-time communication notification unit 183 sends notifications to the real-time communication request process common library 192.

Specifically, the real-time communication notification unit 183 sends time notifications to the real-time communication request process common library 192 at regular intervals. The real-time communication transmission request process logic included in the real-time communication request process common library 192 starts to operate in response to every time notification, and checks whether there is any frame transmission processing having timed out. Time-out of a frame transmission processing is an event which occurs when a predetermined time elapses before a transmission completion notification using a reception notification is sent to the real-time communication request process common library 192, for example, before the real-time communication unit 181 receives an acknowledgement from an external device which was the destination of transmission. The real-time communication notification unit 183 can instruct the real-time communication-unit interface 182 to perform frame re-transmission (re-transmission using an application layer) by sending a time notification related to transmission time-out.

Also, if the real-time communication notification unit 183 receives frames transmitted from an external device toward the communication processing apparatus 1, it sends a reception notification to the real-time communication request reception logic and the real-time communication reception processing logic included in the real-time communication request process common library 192. As a result, the real-time communication reception processing logic included in the real-time communication request process common library 192 can take the received frames.

The transmission buffer 184 is a buffer for storing data on frames to be transmitted, at least temporarily. The real-time communication-unit interface 182 writes data on frames to be transmitted, in the transmission buffer 184. The frames written in the transmission buffer 184 are sequentially read, and transmitted to external devices. Also, the transmission buffer 184 basically uses FIFO (First In First Out); however, passing in the processing order may occur on the basis of the priorities and so on of frames.

The self-diagnostic unit 185 detects unstable operations in the real-time communication processing and status of the real-time communication unit 181. If detecting an unstable operation, the self-diagnostic unit 185 notifies the unstable operation to the real-time communication-unit interface 182. Specifically, the self-diagnostic unit 185 detects unstable operations in real-time communication processing and status (for example, processing load such as the CPU usage rate and so on, response time lags, and so on), and in the case where an unstable operation is recognized, the self-diagnostic unit notifies the operation status (the unstable operation) to the real-time communication-unit interface 182. Specifically, the self-diagnostic unit 185 detects diagnostic indexes (index values such as the CPU usage rate, process response times, and so on) related to processing of the real-time communication unit 181, and in the case where the diagnostic indexes are within predetermined ranges, the self-diagnostic unit notifies the operation status to the real-time communication-unit interface. For example, in the case where the CPU usage rate exceeds a predetermined threshold, or in the case where a process response time exceeds a predetermined threshold, the self-diagnostic unit 185 determines that an unstable operation has occurred, and sends a notification to the real-time communication-unit interface 182. The self-diagnostic unit 185 refers to the self-diagnostic index storage unit 186 (to be described below) in order to detect unstable operations. The self-diagnostic unit 185 detects unstable operations of the real-time communication unit 181 by monitoring, for example, (1) CPU load (the CPU usage rate) and (2) responsibility (response times). Now, these will be described.

(1) CPU Load

The self-diagnostic unit 185 acquires the value of the CPU usage rate of the real-time communication unit 181 from the general-purpose OS 36. The general-purpose OS 36 has an interface usable when programs acquire performance data of the OS, and the performance data includes the values of the CPU usage rates of individual tasks. In the case where the CPU usage rate of the real-time communication unit 181 exceeds the predetermined threshold, the self-diagnostic unit 185 detects that status as an unstable operation.

However, the self-diagnostic unit 185 may be configured to detect unstable operations on the basis of other indexes. For example, the self-diagnostic unit 185 may acquire numerical information, such as the CPU usage rate of the whole of the general-purpose OS 36, the number of CPU cores assigned to virtual hardware 15 which the general-purpose OS 36 executes, and so on. If the result of a determination using a combination of some of those values exceeds a predetermined threshold (for example, if the CPU usage rate exceeds 30% when the number of CPU cores is 4, or if the CPU usage rate exceeds 15% when the number of CPU cores is 8, or the like), the self-diagnostic unit 185 detects that an unstable operation has occurred.

(2) Responsibility

The self-diagnostic unit 185 detects the case where the responsibility of the real-time communication unit 181 is low, as the case where an unstable operation has occurred. Specifically, the self-diagnostic unit 185 acquires information on the number of retries which have been performed when the real-time communication unit 181 has performed frame transmission. A transmission retry occurs in the case where the real-time communication unit 181 is instructed to delay the processing. In the case where a retry occurs, it can be considered that real-time performance in communication is being impaired. Therefore, in the case where the number of retries related to one frame exceeds a predetermined threshold, or in the case where the total number of transmission retries in a predetermined period exceeds a predetermined threshold, the self-diagnostic unit 185 determines that status as an unstable operation.

The self-diagnostic unit 185 may be configured to detect unstable operations on the basis of statuses other than the indexes listed above. Also, various thresholds (mentioned above) which the self-diagnostic unit 185 uses to detect unstable operations can be stored in the self-diagnostic index storage unit 186 (to be described below) in advance. Also, these thresholds may be set from the outside.

The self-diagnostic index storage unit 186 stores a plurality of pairs of indexes usable when the self-diagnostic unit 185 detects unstable operations and thresholds for the indexes. For example, the self-diagnostic index storage unit 186 stores a threshold for the CPU usage rate of the real-time communication unit 181, a threshold for the number of retries of each transmission frame, and other thresholds.

The request buffer 188 is a buffer for storing communication requests coming from the application units 701 and so on, at least temporarily. Communication requests which are transmitted from the real-time communication request process common library 192 are written in the request buffer 188. Examples of communication requests which are written include frame transmission requests, frame reception requests, and so on. Frames written in the request buffer 188 are subsequently read and processed by the real-time communication-unit interface 182. Also, the request buffer 188 basically uses FIFO (First In First Out); however, passing in the processing order may occur on the basis of the priorities and so on of communication requests.

Figure 2:
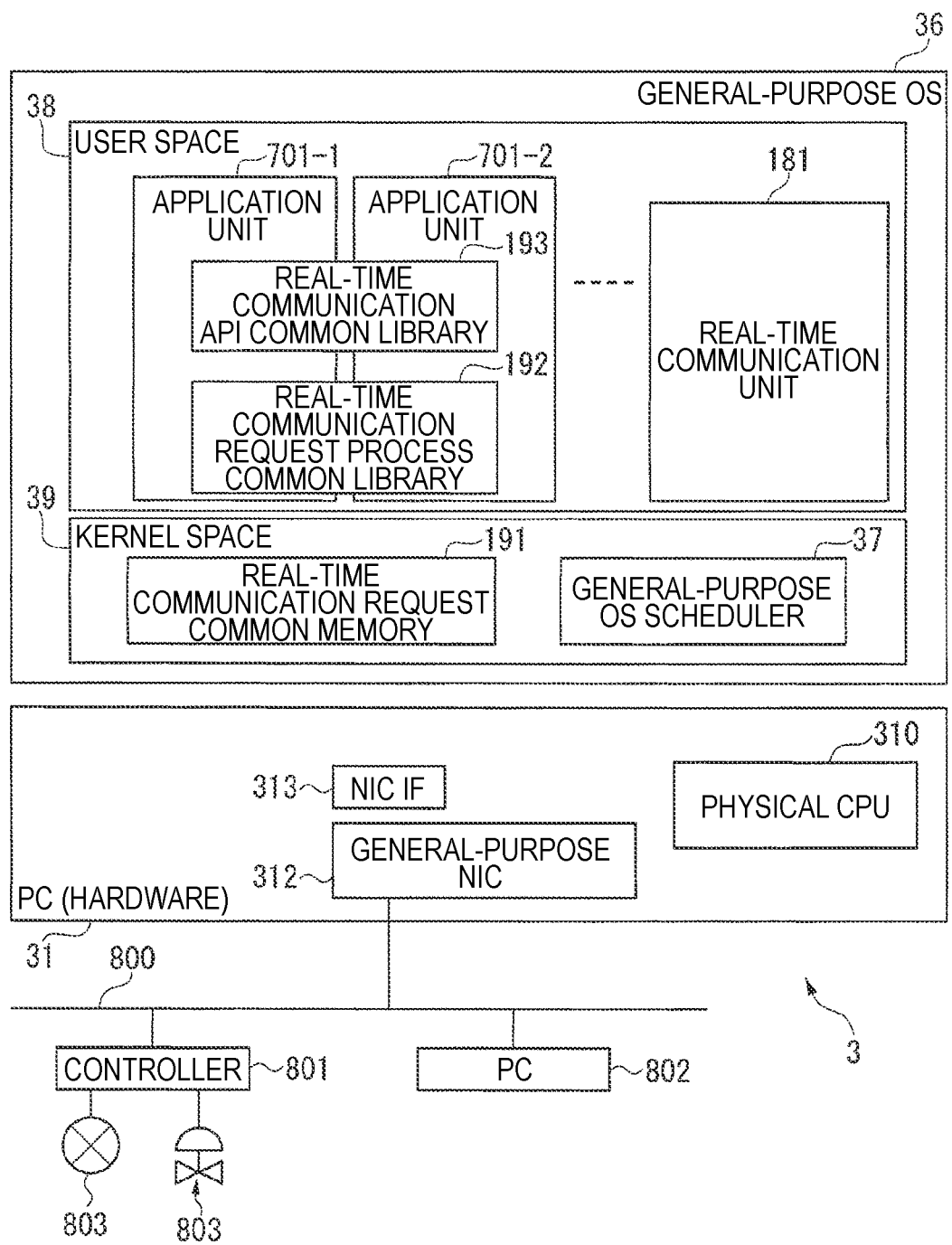
FIG. 2 is a block diagram illustrating a functional configuration of the communication processing apparatus according to one or more embodiments, from a different point of view.

FIG. 2 is a block diagram illustrating a functional configuration of the communication processing apparatus 3 according to one or more embodiments, from a different point of view.

The general-purpose OS 36 of FIG. 2 is the same as the general-purpose OS 36 shown in FIG. 1. The general-purpose OS 36 includes the user space 38 and a kernel space 39. The user space 38 includes the application units 701-1, 701-2, . . . , and the real-time communication unit 181. The application units 701-1, 701-2, . . . , and the real-time communication unit 181 are executed as independent tasks in the user space 38. As shown in the drawing, in one or more embodiments, the function of the real-time communication request process common library 192 and the function of the real-time communication API common library 193 are incorporated, for example, as library functions, in the application units 701-1, 701-2, . . . . Also, the kernel space 39 includes the real-time communication request common memory 191 described above, and the general-purpose OS scheduler 37.

As described above, the PC 31 (hardware) includes the physical CPU 310, the physical NIC 312, and the NIC interface 313.

The PC 31 is connected to a control network 800 via the physical NIC 312. The control network 800 is a network for performing communication with other devices constituting the process control system. The control network 800 is connected to devices such as the controller 801, the PC 802, and so on. The PC 31 performs communication with the controller 801 and the PC 802 via the control network 800, for example, by an HMI. Also, the controller 801 transmits measurement data to the PC 31, and receives the amount of operation from the PC 31. Further, the controller 801 is connected to a plurality of field devices 803. The controller 801 performs plant control by controlling the field devices 803. The field devices 803 are devices, for example, sensors such as a flowmeter, a thermometer, a hydrometer, a manometer, and the like, valves, pumps, actuators, and so on.

Now, how the communication processing apparatus 3 having the above-described configuration operates, and how the special effect thereof is produced will be described.

Recently, due to improvement in performance of CPUs, even by the general-purpose OS 36, it is possible to secure such real-time performance that the maximum latency is about 25 milliseconds. For example, in the case of using the Vnet/IP (registered as a trade mark) which is a real-time plant network system, the intervals between time slots for determining transmission timings and so on are 100 milliseconds, if a delay is shorter than 100 milliseconds, it is possible to continue real-time communication by performing processing to compensate the delay. In other words, theoretically, it is possible to implement a real-time communication function on the general-purpose OS. However, in the system which is actually applied, on the general-purpose OS 36, not only the real-time communication unit 181, but also other functions are executed in parallel. Here, other functions are, for example, application software which does not perform real-time communication. Also, other examples are application software which performs real-time communication and performs non-real-time communication using communication functions other than the real-time communication unit 181, and so on.

In order to prevent the responsibility from deteriorating due to the operations of such application software and so on, a method of assigning higher task priorities to tasks for which high responsibility is required (for example, tasks of the real-time communication unit 181) as compared to task priorities which are assigned to application software can be used.

However, unlike the schedulers of real-time OSs, the schedulers of existing general-purpose OSs are characterized by assigning some necessary computational resources even to tasks having low priorities such that the tasks can be executed in parallel. The reason is that such general-purpose OS schedulers assign a predetermined amount of computational resources even to tasks having low priorities in order to prevent execution of such tasks from completely stopping. In other words, if a control system is constructed using such a general-purpose OS, real-time performance for tasks having high priorities may be impaired by the operations of other applications (having low priorities) and so on. In some cases, processing of a high-priority task which is of the order of 100 milliseconds may stop.

The schedulers of general-purpose OSs are configured to assign the CPU time to tasks such that more CPU time is assigned to tasks having higher priorities. However, in the case where high-priority tasks use an excessive amount of CPU time, the schedulers of a certain type of general-purpose OSs prohibit execution of high-priority tasks, and assign the corresponding amount of CPU time to low-priority tasks. In other words, by doing so, such general-purpose OS schedulers try to secure parallel execution of all tasks which are under the management. In the case where a scheduler performs such control, high-priority tasks are delayed, and real-time performance is impaired.

For this reason, the self-diagnostic unit 185 included in the real-time communication unit 181 according to one or more embodiments monitors the processing load of the real-time communication unit 181. Also, if detecting that the processing load of the real-time communication unit 181 has reached a threshold, the self-diagnostic unit 185 instructs the real-time communication-unit interface 182 to decrease the processing load of frame transmission. The self-diagnostic unit 185 detects whether the CPU usage rate of the real-time communication unit 181 exceeds a predetermined threshold, as an example of the diagnostic indexes for monitoring the processing load. This threshold can be set from the outside on the basis of the number of CPU cores assigned to the general-purpose OS 36 and the result of a high load test. If the real-time communication-unit interface 182 receives a notification representing that the processing load has become high from the self-diagnostic unit 185, it performs control for reducing the processing load of the real-time communication unit 181. As a specific example, the real-time communication-unit interface 182 suppresses the amount by which it takes frame transmission requests of the application units 701 from the request buffer 188. This amount is, for example, the number of transmission frames per unit time, the number of transmission bytes per unit time, or the like. For example, the real-time communication-unit interface 182 waits for a predetermined time (for example, in a range of 1 millisecond or less) in order to take transmission requests from the request buffer 188. This decreases the computational resource usage rate (such as the CPU usage rate) of the real-time communication unit 181.

By the above-described control, the computational resource usage rate (such as the CPU usage rate) of high-priority tasks (the real-time communication unit 181) is suppressed to a predetermined value or less. Therefore, if low-priority tasks (the application units 701 and so on) use an excessive amount of CPU time, the general-purpose OS scheduler 37 stops the execution of the low-priority tasks, and preferentially assigns the CPU time to high-priority tasks. In other words, the self-diagnostic unit 185 and the real-time communication-unit interface 182 suppress the processing load of the real-time communication unit 181 in cooperation with each other, whereby the real-time communication unit 181 can always secure a necessary CPU time. In other words, the self-diagnostic unit 185 and the real-time communication-unit interface 182 relieve unstable operations of the real-time communication unit 181 in cooperation with each other, whereby the real-time communication unit 181 can always a necessary amount of CPU time. In other words, the real-time performance of the communication processing apparatus 3 is maintained.

As described above, in the communication processing apparatus 3 of one or more embodiments including the real-time communication unit 181, real-time performance is not impaired. In other words, in the communication processing apparatus 3, in communication with another device having been started, and diagnosis communication notifying the existence of the corresponding device to other devices, any communication delay does not occur.

Now, the reason why the real-time communication request process common library 192 and the real-time communication unit 181 are separated as different functional units will be described.

The real-time communication unit 181 performs processing according to requests from the plurality of application units 701. Therefore, the concentration of the processing load on the real-time communication unit 181 should be prevented. If the real-time communication request process common library 192 and the real-time communication unit 181 are separated, it becomes possible to reduce the processing load of the real-time communication unit 181. In the case of executing the function of the real-time communication request process common library 192 while statically linking the corresponding function to the application units 701, tasks of the application units 701 bear the processing load of the function of the real-time communication request process common library 192. Therefore, the application units 701 can issue communication requests without considering the processing load status of the real-time communication unit 181.

If the function of the real-time communication request process common library 192 is being used for tasks of the real-time communication unit (181) side, the consumption of the computational resources of the real-time communication unit 181 (such as the CPU usage rate) depends on requests of the application units 701. This can be a factor which impairs the real-time performance of the communication processing apparatus 3.

If the function of the real-time communication request process common library 192 is configured independently from the real-time communication unit 181, the following situation occurs. Even though a lot of communication requests are issued from the application units 701 and so on, the communication requests are stored in the request buffer 188 of the real-time communication-unit interface 182. Therefore, the real-time communication unit 181 performs processing of the communication requests only at the suppressed pace. Therefore, the real-time performance of the communication processing apparatus 3 is maintained.

Now, the proceeding procedures of the internal functions of the communication processing apparatus 3 will be described.

Figure 3:
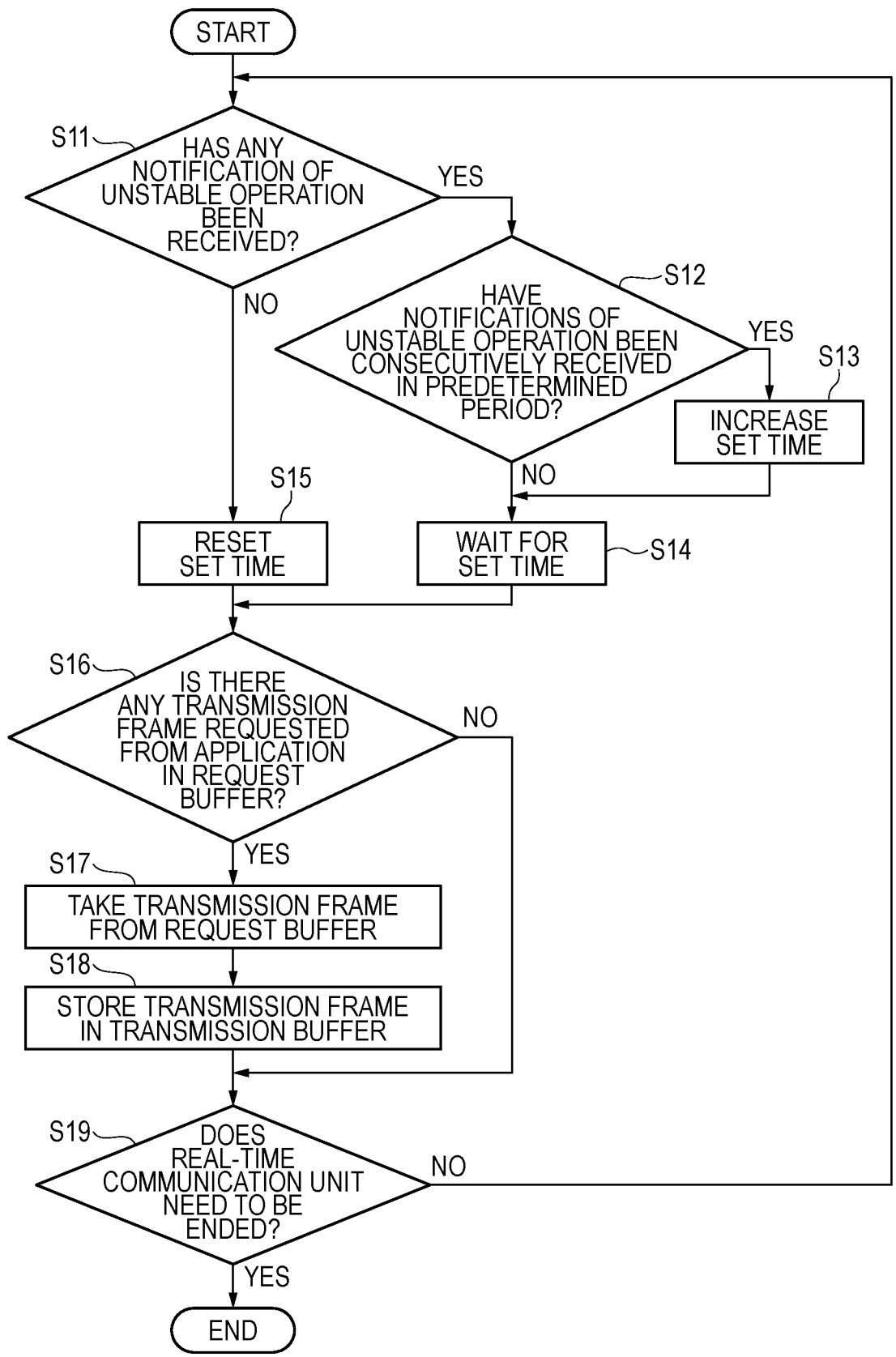
FIG. 3 is a flow chart illustrating the proceeding procedure of a real-time communication-unit interface according to one or more embodiments.

FIG. 3 is a flow chart illustrating the operation procedure of the real-time communication-unit interface 182 included in the real-time communication unit 181. Along this flow chart, the following description will be made.

First, in STEP S11, the real-time communication-unit interface 182 determines whether any notification of an unstable operation has been recently received from the self-diagnostic unit 185. In the case where a notification of an unstable operation has been recently received ("YES" in STEP S11), the real-time communication-unit interface proceeds to STEP S12; whereas in the case where any notification of an unstable operation has not been recently received ("NO" in STEP S11), the real-time communication-unit interface proceeds to STEP S15.

In the case of proceeding to STEP S12, in STEP S12, the real-time communication-unit interface 182 determines whether notifications of the unstable operation have been consecutively received in a predetermined period in the past. In the case where notifications of the unstable operation have been consecutively received ("YES" in STEP S12), the real-time communication-unit interface proceeds to STEP S13; whereas in the case where notifications of the unstable operation have not been consecutively received ("NO" in STEP S12), the real-time communication-unit interface proceeds to STEP S14.

In the case of proceeding to STEP S13, in STEP S13, the real-time communication-unit interface 182 adds a given time to a set time. The set time is a set time for which the real-time communication-unit interface should wait in STEP S14. Also, the time which is added in STEP S13 is a positive value. In other words, in the processing of STEP S13, the real-time communication-unit interface 182 increases the set time.

In the case of proceeding to STEP S14 (from STEP S12 or S13), in STEP S14, the real-time communication-unit interface 182 waits for the set time. In other words, the real-time communication-unit interface 182 waits for the set time before proceeding to the next step. While the real-time communication-unit interface 182 waits in STEP S14, since computational resources are assigned to other processing which are performed in the real-time communication unit 181 and processing of the application units 701, the processing load of the real-time communication unit 181 decreases as compared to the case where the real-time communication-unit interface does not wait. After the real-time communication-unit interface 182 starts to wait, if the set time elapses, computational resources are re-assigned to the real-time communication-unit interface 182, and the real-time communication-unit interface proceeds to the processing of the next step. After finishing the processing of STEP S14, the real-time communication-unit interface proceeds to STEP S16.

Also, in one or more embodiments, such control on assignment of computational resources is performed by the general-purpose OS scheduler 37.

In the case of proceeding to STEP S15, in STEP S15, the real-time communication-unit interface 182 resets the set time to an initial value. In other words, even in the case where the set time has been increased in STEP S13, if a notification of an unstable operation has not been received in the procedure before STEP S15, the real-time communication-unit interface returns the set time to its initial value.

If determining in STEP S11 that any unstable-operation notification has not been received ("NO"), immediately, the real-time communication-unit interface performs the processing of STEP S15 to reset the set time. However, the real-time communication-unit interface may be configured to reset the set time in STEP S15 only in the case where the state where any unstable-operation notification has not been received for a predetermined time.

After finishing the processing of STEP S15, the real-time communication-unit interface proceeds to STEP S16.

In STEP S16, the real-time communication-unit interface 182 determines whether there is any transmission frame requested by the application unit 701-1 or 701-2, or the like (an application). Specifically, the real-time communication-unit interface 182 determines whether three is any transmission frame, with reference to the request buffer 188. In the case where there is any transmission frame ("YES" in STEP S16), the real-time communication-unit interface proceeds to STEP S17. In the case where there is no transmission frame ("NO" in STEP S16), the real-time communication-unit interface jumps to STEP S19.

In the case of proceeding to STEP S17, in STEP S17, the real-time communication-unit interface 182 takes one transmission frame from the request buffer 188. However, in the case where it is possible to take and transmit a plurality of transmission frames at once, the real-time communication-unit interface 182 takes a predetermined number of transmission frames, or less, from the request buffer 188. Also, transmission frames stored in the request buffer 188 are appropriately deleted after transmission to the transmission buffer 184 succeeds.

Subsequently, in STEP S18, the real-time communication-unit interface 182 stores the transmission frame taken in STEP S17, in the transmission buffer 184.

Figure 4:
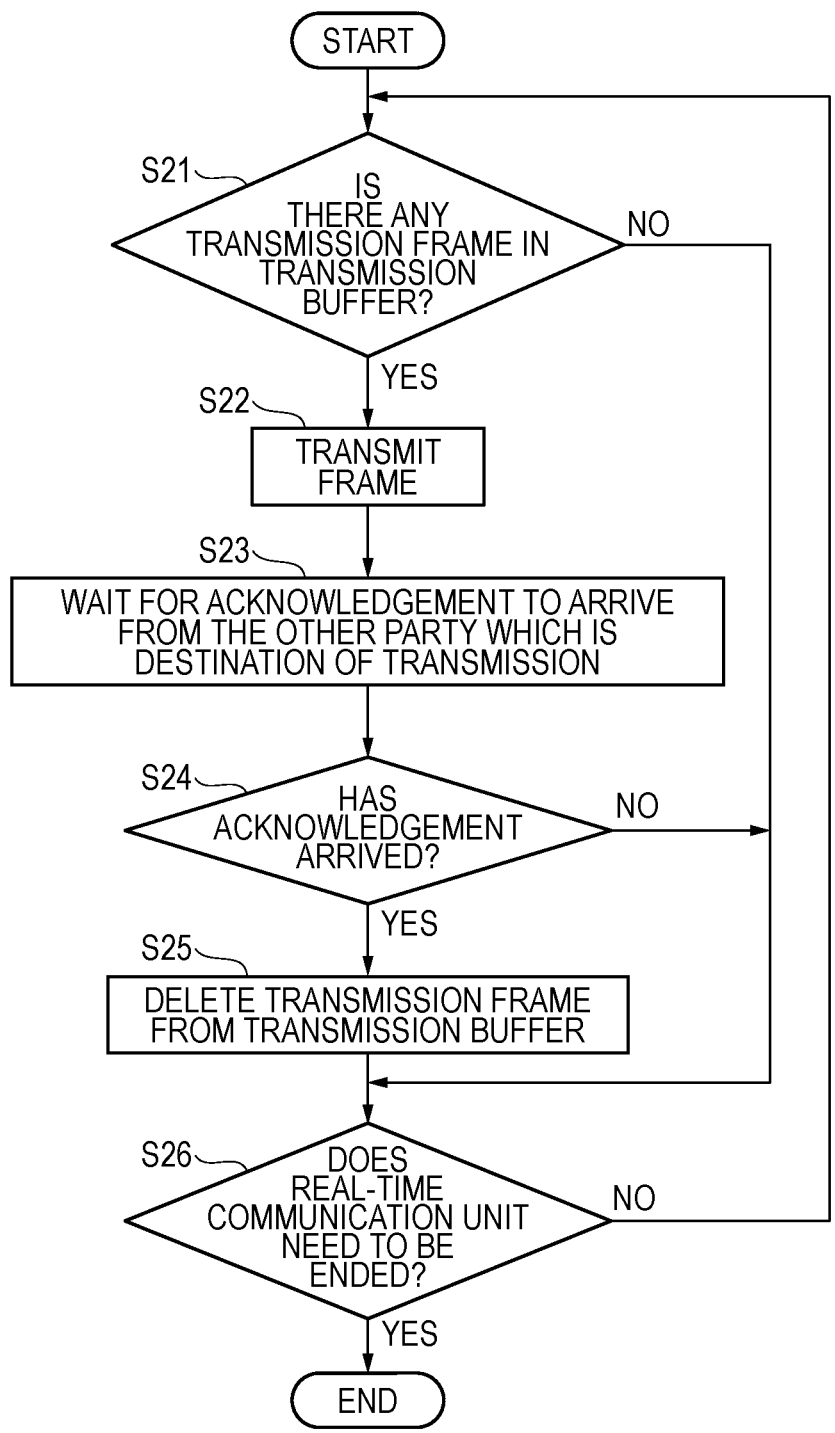
FIG. 4 is a flow chart illustrating the proceeding procedure of the real-time communication unit according to one or more embodiments.

Also, transmission frames stored in the transmission buffer 184 are sequentially transmitted by the real-time communication unit 181 (see FIG. 4).

Subsequently, in STEP S19, the real-time communication-unit interface 182 determines whether the processing of the real-time communication unit 181 needs to be ended. The processing of the real-time communication unit 181 is ended, for example, if an end instruction is input from an upper management function in the real-time communication unit 181, if an end command is input from an operator or the like, if it is determined that the processing needs to be ended, as the result of analysis of interruption caused by an error event or the like. In the case where the real-time communication unit 181 is ended ("YES" in STEP S19), the processing of the entire flow chart is ended. In the case where the real-time communication unit 181 is not ended ("NO" in STEP S19), the real-time communication-unit interface returns to STEP S11, and repeats the above-described processing.

Also, the waiting time (set time) of STEP S14 is determined by the predetermined initial value and the additional value which is added in STEP S13. This additional value also can be determined in advance. If the situation where unstable-operation notifications are consecutively received for a predetermined period continues, the real-time communication-unit interface may repeat STEP S13 to add a time to the set time, a plurality of times (by returning the processing from STEP S19 to STEP S11).

Also, regardless of whether a time is added to the set time in STEP S13, a lower limit or an upper limit for the waiting time of STEP S14 may be determined in advance. In the case where an upper limit is determined in advance, the result of addition of STEP S13 should not exceed the upper limit.

Also, the waiting time of STEP S14 may be determined by considering the contents of unstable-operation notifications as well. The waiting time of STEP S14 is not limited to a value based on clocking, and for example, an operation of waiting until a certain status change occurs, for example, until the unstable operation is resolved may be used.

Also, in STEP S12, the real-time communication-unit interface determines whether notifications of the unstable operation have been consecutively received. An example of a specific method of performing such determination is as follows. Specifically, in STEP S11, the real-time communication-unit interface determines whether any unstable-operation notification has been received, and in the case where the results of n-number of times or more of m-number of times of determination of STEP S11 performed in the recent past were "YES" (unstable-operation notifications had been received), and the result of the latest determination was also "YES" (a unstable-operation notification had been received), it is determined that unstable-operation notifications have been consecutively received for the predetermined period ("YES" in STEP S12). Here, m and n are predetermined integers, respectively, and satisfy 1<n<m.

In the flow chart shown in FIG. 3, while the status of an unstable operation continues, the determination result of STEP S11 is always "YES". In this case, in taking transmission requests from the request buffer 188, waiting of STEP S14 is involved. Depending on the relation between how often transmission requests are taken from the request buffer 188 and how often transmission requests come to the request buffer 188, a time for which a transmission request stays in the request buffer 188 may be a time required for the real-time communication transmission request process logic included in the real-time communication request process common library 192 to recognize time-out of a frame transmission processing. In every case including the above-mentioned case, the real-time communication-unit interface 182 suppresses the transmission-request processing amount until the status of the unstable operation is resolved.

FIG. 4 is a flow chart illustrating the operation procedure of the real-time communication unit 181. Along this flow chart, the following description will be made.

In STEP S21, the real-time communication unit 181 determines whether there is any transmission frame written in the transmission buffer 184. In the case where there is any transmission frame in the transmission buffer 184 ("YES" in STEP S21), the real-time communication unit proceeds to STEP S22. In the case where there is no transmission frame in the transmission buffer 184 ("NO" in STEP S21), the real-time communication unit jumps to STEP S26.

In the case of proceeding to STEP S22, the real-time communication unit 181 takes one transmission frame from the transmission buffer 184, and transmits that frame. However, in the case where it is possible to take and transmit a plurality of transmission frames at once, the real-time communication unit 181 takes a predetermined number of transmission frames or less from the transmission buffer 184, and transmits those frames.

In STEP S23, the real-time communication unit 181 waits for an acknowledgement (Ack) to arrive from the other party to which the frame was transmitted in STEP S22 (the frame receiving party), for a predetermined time.

In STEP S24, the real-time communication unit 181 determines whether the desired acknowledgement has arrived. In the case where the acknowledgement has arrived ("YES" in STEP S24), i.e. if confirming that the transmitted frame was received by the other party, the real-time communication unit proceeds to STEP S25. In the case where the acknowledgement has not arrived ("NO" in STEP S24), i.e. in the case where a negative acknowledgement corresponding to the transmitted frame has arrived, or in the case where the desired acknowledgement has timed out, the real-time communication unit jumps to STEP S26 (in other words, the real-time communication unit skips the processing of STEP S25).

In STEP S25, the real-time communication unit 181 deletes the frame which has been successfully transmitted, i.e. the transmission frame for which the acknowledgement has been obtained, from the transmission buffer 184.

Also, in the case where the acknowledgement has not arrived while the processing has been performed a predetermined number of times, the real-time communication unit 181 may determine that the transmission destination cannot perform communication. In this case, the real-time communication unit 181 may delete the transmission frame from the transmission buffer, and let the transmission fail.

In STEP S26, the real-time communication unit 181 determines whether the processing of the real-time communication unit 181 needs to be ended. The processing of the real-time communication unit 181 needs to be ended in situations as described with respect to STEP S19 of FIG. 3. In the case where the real-time communication unit 181 is ended ("YES" in STEP S26), the processing of the entire flow chart is ended. In the case where the real-time communication unit 181 is not ended ("NO" in STEP S26), the real-time communication unit returns to STEP S21, and repeats the above-described processing.

As described above, according to one or more embodiments, the following effects are obtained.

The communication processing apparatus 3 adjusts the throughput of the real-time communication unit 181, on the basis of the processing load of the real-time communication unit 181. Specifically, for example, the communication processing apparatus performs adjustment to make the pace at which the real-time communication unit 181 into which requests to be processed flow performs processing, relatively faster or slower. The communication processing apparatus performs such adjustment on the basis of the magnitude of the processing load which the self-diagnostic unit 185 detects. Specifically, for example, the communication processing apparatus adjusts the amount of transmission requests which the real-time communication unit 181 takes from the request buffer 188 (or the amount of data to be processed), thereby increasing or decreasing the CPU usage time related to the processing. As a result, load balancing between processing of the application units 701 which may be non-real-time processing and processing of the real-time communication unit 181 which needs to be real-time processing becomes possible. Due to the above-described effect, the real-time performance of the communication processing apparatus 3 in processing is secured.

Also, in one or more embodiments, it is possible to prevent the real-time performance from being impaired by task adjustment which the general-purpose OS scheduler 37 performs for the real-time communication unit 181. In other words, it is possible to avoid a situation in which the amount of CPU time which is assigned to the real-time communication unit 181 decreases since the processing load of the real-time communication unit 181 has increased (for example, since the CPU usage rate has become higher than a predetermined level).

Also, in the case of executing the logic of the real-time communication request process common library 192 by tasks of the application units 701, the processing load of that logic is not applied to the real-time communication unit 181, and it is possible to maintain the state in which the real-time performance of the communication processing apparatus 3 is prevented from being impaired.

Also, by achieving a processing load balance, it is possible to prevent communication with another device which the real-time communication unit 181 has started, diagnosis communication notifying the existence of the communication processing apparatus to other devices from being delayed.

Also, since the real-time communication request process common library 192 and the real-time communication unit 181 are not modules (device drivers) in the kernel space of the general-purpose OS, it is possible to avoid problems in maintenance and problems in compatibility which may be caused by device drivers.

In the following description of one or more embodiments, some of the points already described about one or more embodiments described above are omitted.

Figure 5:
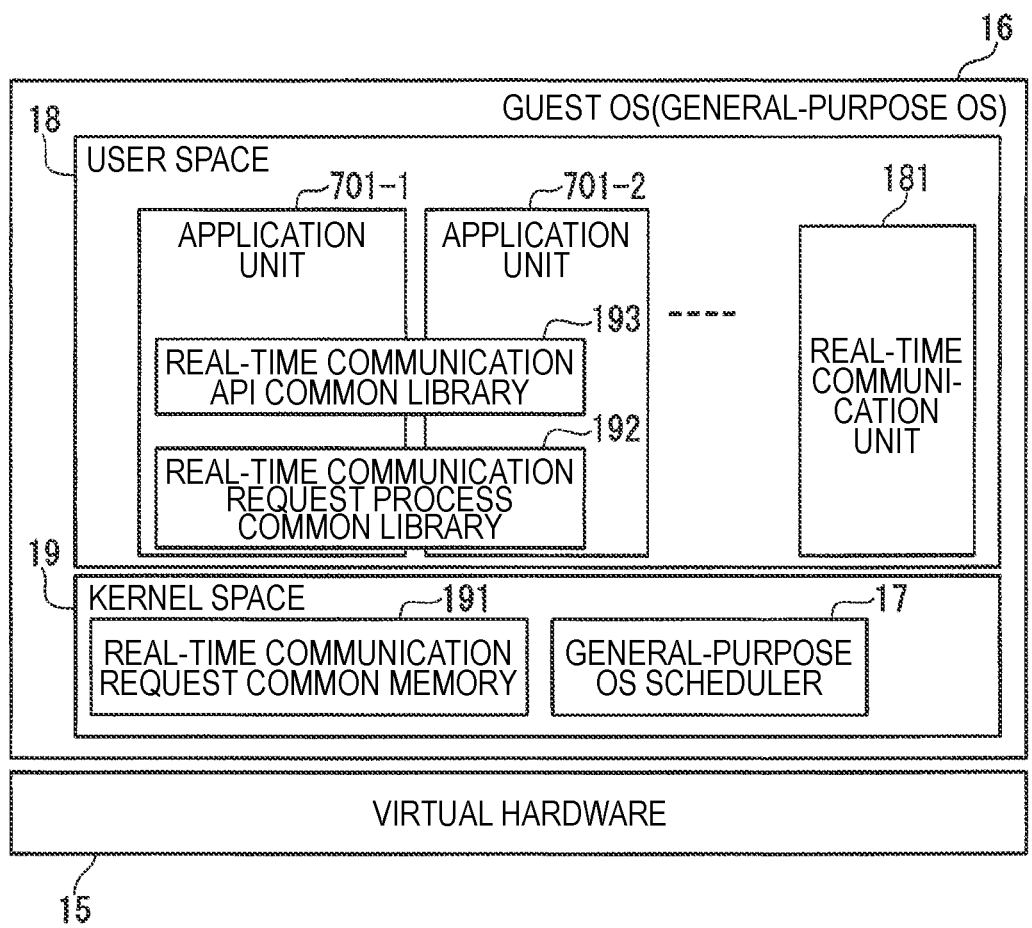
FIG. 5 is a functional block diagram illustrating some of functional components of a communication processing apparatus according to one or more embodiments of the present invention.

FIG. 5 is a functional circuit block illustrating some of functional components of a communication processing apparatus according to one or more embodiments. As shown in the drawing, a communication processing apparatus 1 includes virtual hardware 15 which is executed on a PC, and guest OSs 16 which are executed on the virtual hardware 15. Also, the guest OSs 16 may be general-purpose OSs identical to that of one or more embodiments described above.

A feature of one or more embodiments is that a virtualizing unit 12 is provided in order to execute a plurality of pieces of virtual hardware 15 and execute the above-mentioned guest OSs 16 on the plurality of pieces of virtual hardware 15.

Each guest OS 16 has a user space 18 and a kernel space 19.

In the kernel space 19, a general-purpose OS scheduler 17 and a real-time communication request common memory 191 exist.

The general-purpose OS scheduler 17 schedules a plurality of tasks to be executed in the user space 18. In other words, the general-purpose OS scheduler 17 assigns computational resources to individual tasks in the user space 18. In one or more embodiments, each guest OS 16 is not an OS for real-time control, and each general-purpose OS scheduler 17 is not a real-time scheduler. Also, although FIG. 5 shows only one user space 18, the general-purpose OS scheduler 17 may manage a plurality of user spaces 18.

In the user space 18, the application units 701-1, 701-2, . . . , and the real-time communication unit 181 exist.

In the application units 701-1, 701-2, . . . , the functions of library functions of the real-time communication request process common library 192 and the real-time communication API common library 193 are incorporated.

The real-time communication unit 181 is executed as a task independent from the application units 701-1, 701-2, . . . .

Figure 6:
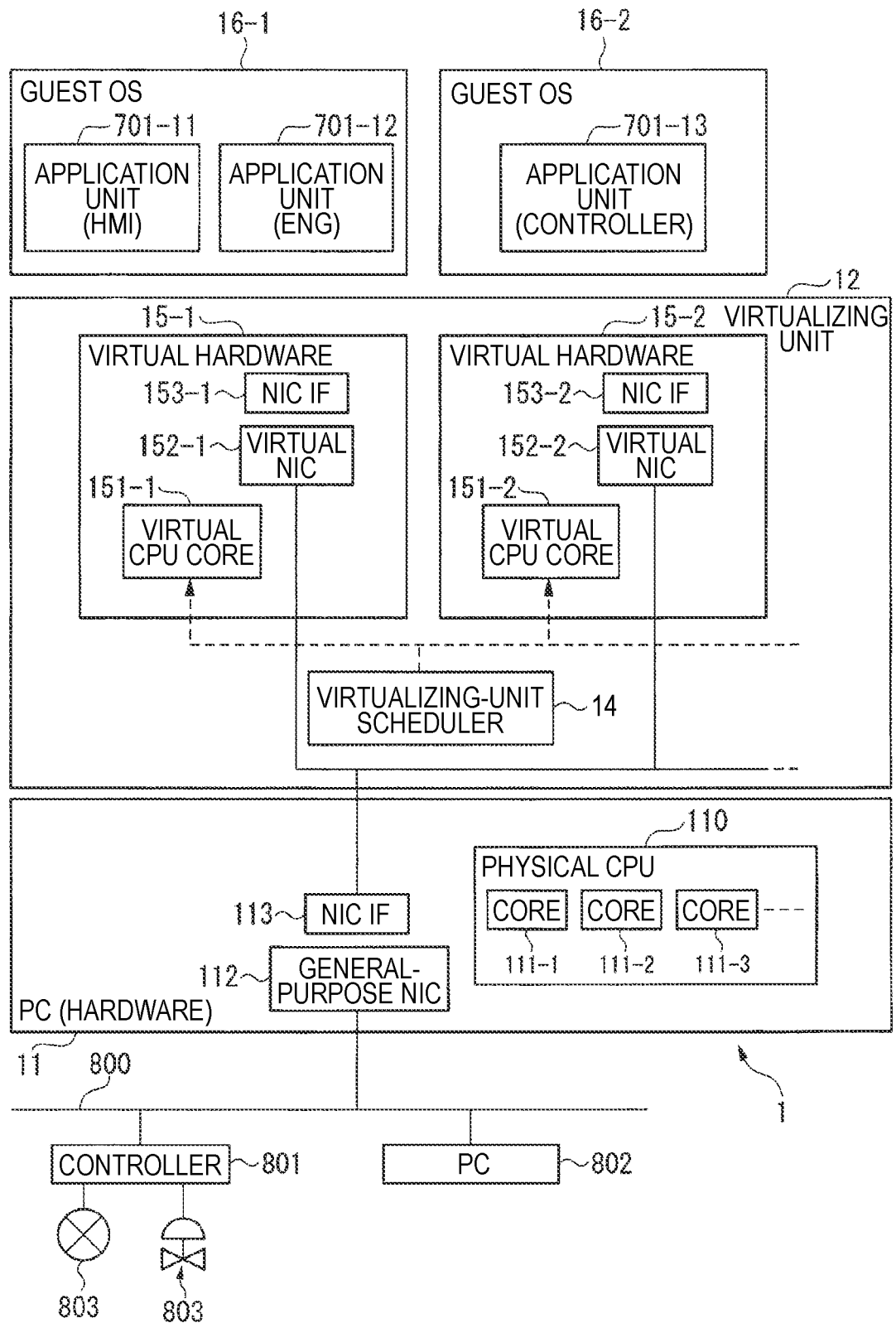
FIG. 6 is a block diagram illustrating the whole of the communication processing apparatus 1 according to one or more embodiments, with a focus on a function for virtualizing a PC and executing guest OSs on a plurality of pieces of software, respectively.

FIG. 6 is a block diagram illustrating the whole of the communication processing apparatus 1 according to one or more embodiments, with a focus on a function for virtualizing a PC and executing the guest OSs on a plurality of pieces of virtual hardware, respectively. As shown in the drawing, the communication processing apparatus 1 includes the virtual hardware 15 which is executed on a PC (Personal Computer), and the guest OSs 16 which are executed on the virtual hardware 15.

Each of guest OSs 16-1 and 16-2 of FIG. 6 is identical to the guest OS 16 shown in FIG. 5. Although FIG. 6 shows a state where two guest OSs are executed, the number of guest OSs is arbitrary, and may be one, or may be three or more. Also, each of virtual hardware 15-1 and virtual hardware 15-2 is identical to the virtual hardware 15 shown in FIG. 5. On the virtual hardware 15-1, the guest OS 16-1 is executed, and on the virtual hardware 15-2, the guest OS 16-2 is executed. In the case where three or more pieces of virtual hardware 15 are included, similarly, guest OSs 16 can be executed on pieces of virtual hardware 15, respectively.

Also, as shown in FIG. 6, the communication processing apparatus 1 is implemented using a PC 11. The PC 11 has functions which normal computers have, such as the functions of a processor, a memory, an interface for communication, and so on. On the PC 11, functions which are implemented by software are stored as executable programs in appropriate storage areas. Also, those programs are appropriately executed by the processor (the following physical CPU 110).

The PC 11 is hardware, and is configured to include the physical CPU 110, a general-purpose NIC 112, and an NIC interface 113.

The physical CPU 110 includes cores 111-1, 111-2, 111-3, . . . therein. The number of cores which are included in the physical CPU 110 is arbitrary. The individual cores 111 sequentially fetch and execute commands included in programs. Also, the PC 11 may be configured to include a plurality of physical CPUs 110.

The general-purpose NIC 112 is for receiving and executing communication requests transmitted from programs on the PC 11, and so on. The general-purpose NIC 112 performs communication with external devices via a network connected to the PC 11.

The NIC interface 113 is for providing an interface between the general-purpose NIC 112 and programs and the like on the PC 11.

Also, the PC 11 has the function of the virtualizing unit 12. The virtualizing unit 12 is implemented by cooperation of hardware and software. The virtualizing unit 12 includes a virtualizing-unit scheduler 14 and the plurality of pieces of virtual hardware 15 therein.

The virtualizing-unit scheduler 14 appropriately assigns the CPU time of the plurality of cores 111 included in the physical CPU 110, to virtual CPU cores 151 included in the plurality of pieces of virtual hardware 15.

The virtual hardware 15 is virtual computer hardware which is implemented by the function of the virtualizing unit 12. The virtual hardware 15 has, at least, a virtual CPU and a virtual memory. Also, the virtual hardware 15 has a network interface function for performing communication. These virtual resources of the virtual hardware 15 are associated with actual physical computer hardware resources, via the virtualizing unit 12.

The internal configuration of the virtual hardware 15 is as follows. For example, the virtual hardware 15-1 includes a virtual CPU core 151-1, a virtual NIC 152-1, and an NIC interface 153-1. Also, the virtual hardware 15-2 includes a virtual CPU core 151-2, a virtual NIC 152-2, and an NIC interface 153-2. In the case where virtual hardware 15-3 (and so on) exists, each piece of virtual hardware has the same configuration as those of the virtual hardware 15-1 and so on. Also, the functions in the virtual hardware 15 are functions which are implemented by a virtualizing technology.

Also, in the drawing and so on, the virtual hardware and the internal components thereof are denoted by reference symbols having suffixes (1, 2, and so on); however, they are also referred to simply as the virtual hardware 15, the virtual CPU cores 151, the virtual NICs 152, the NIC interfaces 153, and so on.

Each of the virtual CPU cores 151-1, 151-2, and so on is a virtual CPU core which is implemented by the virtualizing unit 12. Each of the virtual CPU cores 151 is one of tasks of the virtualizing unit 12, and the virtualizing-unit scheduler 14 assigns the cores of the physical CPU to such tasks such that programs assigned to the virtual CPU cores 151 can be executed, thereby implementing the functions of the virtual CPU cores. In the case where the virtual hardware 15 is configured to have a multi-core structure, the virtualizing unit 12 associates the plurality of cores 111 with the plurality of virtual CPU cores 151, such that individual tasks can be executed on the virtual CPU cores 151 in parallel. To the individual virtual CPU cores 151, dedicated cores 111 of the physical CPU 110 are assigned. In other words, a core 111 which is assigned to a certain virtual CPU core 151 is different from cores which are assigned to the other virtual CPU cores 151 and a core 111 which is assigned to processing of the virtualizing unit 12. Therefore, since computational resources, particularly, the CPU resources do not compete for the plurality of pieces of virtual hardware 15, the real-time performance of the guest OSs 16 is easily secured.

Also, a user (a manager of the communication processing apparatus 1) can set assignment of the cores 111 of the physical CPU 110 to the virtual CPU cores 151, using a tool for managing the virtualizing unit 12. In one or more embodiments, the virtual resource configuration of each piece of hardware 15 including the number of cores 111 assigned to the virtual CPU cores 151 is basically fixed. However, due to implementation of the virtualizing unit 12, even when the virtual hardware 15 is being executed, it may be possible to change the virtual resource configuration including the number of virtual CPU cores 151 assigned, by setting using the tool, such that the amount of virtual computational resources increases. Also, if the virtual resource configuration is changed such that the amount of computational resources decreases, when the virtual hardware 15 is being executed, the sudden decrease in the amount of computational resources exerts a bad influence on the real-time performance. For this reason, such a change is impossible in principle.

In the case where the amount of physical computer hardware resources is smaller than the amount of virtual resources which the virtual hardware 15 requests, and the amount of computational resources to be assigned is not sufficient, it is also possible to make at least some pieces of virtual hardware share computational resources. This is called an overcommitment. However, if an overcommitment is performed, even in the case where the processing load of a certain piece of virtual hardware 15 becomes high, a sufficient amount of computational resources may not be assigned to the other pieces of virtual hardware 15 sharing computational resources with the corresponding piece of virtual hardware. Such situations may impair the real-time performance of the guest OSs 16. Therefore, actually, overcommitments are not performed.

In other words, in one or more embodiments, the guest OSs 16 (general-purpose OSs) are executed on the virtual hardware 15. Also, a plurality of pieces of virtual hardware 15 cannot share any physical core. In other words, a plurality of pieces of virtual hardware cannot share CPU resources (central-processing-unit resources) which are assigned to the pieces of virtual hardware, respectively. Therefore, it is possible to secure real-time performance in processing in the guest OSs 16.

The virtual NICs 152-1, 152-2, and the like are virtual network interface cards for the pieces of virtual hardware 15-1, 15-2, and the like, respectively. The functions of the virtual NICs 152 are implemented by the virtualizing unit 12. In other words, communication requests from the guest OSs 16 to the virtual NICs 152 are transferred to the general-purpose NIC 112.

Also, the NIC interfaces 153-1, 153-2, and the like are interfaces for accessing the virtual NICs 152-1, 152-2, and the like from the guest OSs 16-1, 16-2, and the like.

In the example shown in FIG. 6, on the guest OS 16-1, an application units 701-11 and 701-12 are executed. Also, on the guest OS 16-2, an application unit 701-13 is executed.

The application unit 701-11 is, for example, an HMI (human-machine interface).

The application unit 701-12 is, for example, an ENG (engineering server).

The application unit 701-13 is, for example, a controller.

In each of the guest OSs 16-1 and 16-2, the real-time communication unit 181 is executed; however, the real-time communication unit 181 of one or more embodiments is not shown in the drawings.

Similarly to the case of one or more embodiments described above, according to one or more embodiments, the PC 11 is connected to the control network 800 via the general-purpose NIC 112. The control network 800 is a network for performing communication with other devices constituting the process control system. The control network 800 is connected to devices such as the controller 801, the PC 802, and so on. The PC 11 performs communication with the controller 801 and the PC 802 via the control network 800, for example, by an HMI. Also, the controller 801 transmits measurement data to the PC 11, and receives the amount of operation from the PC 11. Further, the controller 801 is connected to a plurality of field devices 803. The controller 801 performs plant control by controlling the field devices 803. The field devices 803 are devices, for example, sensors such as a flowmeter, a thermometer, a hydrometer, a manometer, and the like, valves, pumps, and actuators.

In one or more embodiments, by the virtualizing unit 12, the plurality of guest OSs 16 is executed on one PC 11. Also, by the function of the real-time communication unit 181 which is executed by each guest OS 16, similarly to one or more embodiments described above, real-time performance in the functions which are executed on each guest OS 16 is secured.

Also, in one or more embodiments, since the real-time communication unit 181 is executed on the guest OSs 16, even in the case where the virtualizing unit 12 is proprietary software, and function expansion is not performed on the virtualizing unit, real-time control communication is possible.

In the following description of one or more embodiments, some of the points already described about one or more embodiments described above are omitted. Now, points unique to the present embodiment will be mainly described.

In one or more embodiments, the real-time communication request common memory 191 is provided so as to be assessable from the real-time communication request process common library 192. Communication requests from the application units 701 are temporarily stored in the buffer included in the real-time communication request common memory 191. However, the real-time communication request common memory 191 is readable and writable even from every application unit 701. In other words, a security problem that a certain application unit 701 may interfere with communication requests of other application units 701 is concerned. Here, interfering with a communication request is an event such as reading or rewriting the communication request without permission.

In one or more embodiments, in the user space 18, an application proxy unit 291 is provided.

Figure 7:
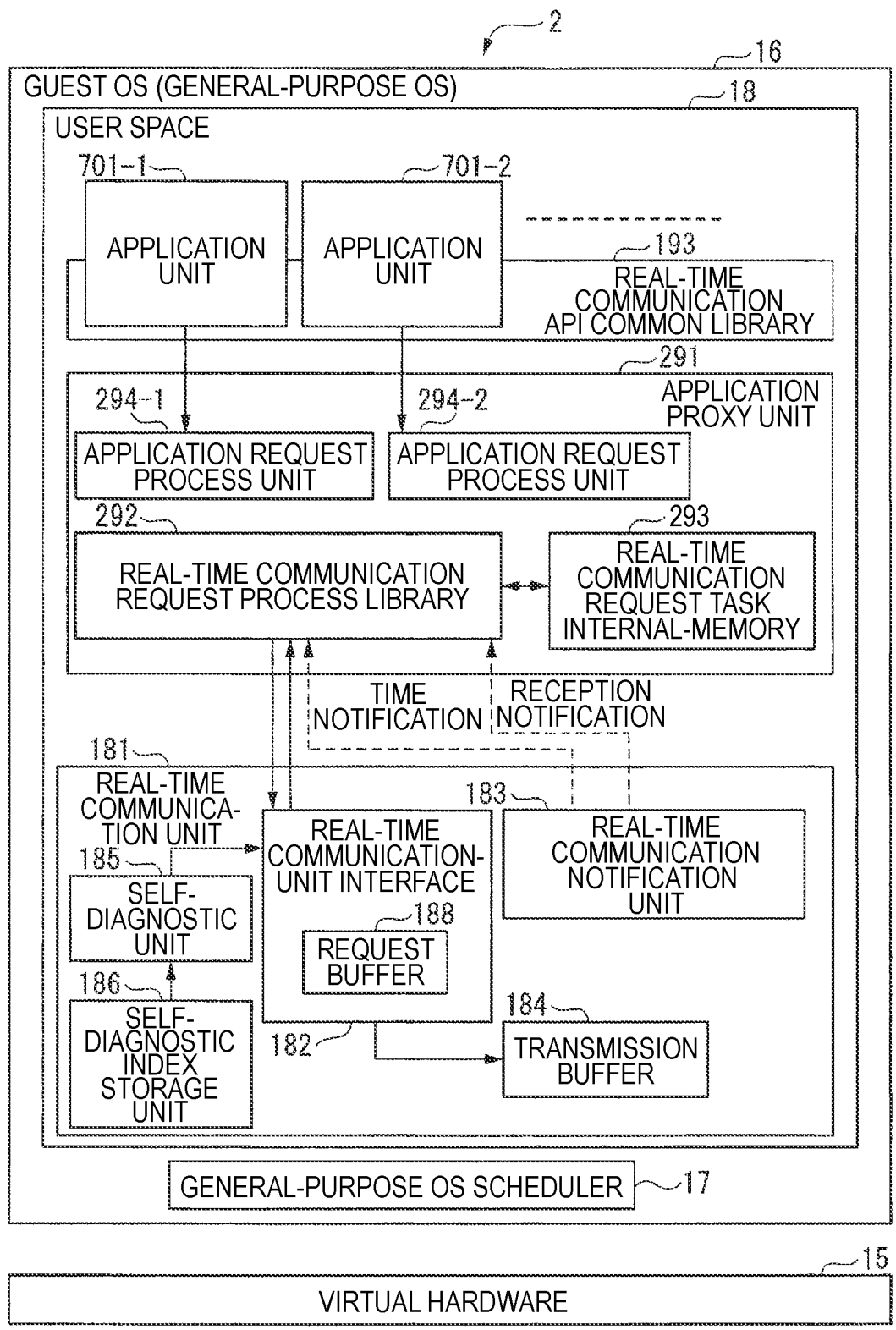
FIG. 7 is a functional block diagram illustrating some functional components of a communication processing apparatus according to one or more embodiments of the present invention.

FIG. 7 is a functional circuit block illustrating some functional components of a communication processing apparatus 2 according to one or more embodiments. A guest OS 16 shown in FIG. 7 is executed on the virtual hardware 15, similarly to one or more embodiments described above (see FIG. 6). In the communication processing apparatus 2 according to one or more embodiments, as shown in FIG. 7, in the user space 18, the functions of the application units 701-1, 701-2, . . . , the real-time communication API common library 193, the application proxy unit 291, and the real-time communication unit 181 are executed.

Of them, the functions of the individual units of the application units 701-1, 701-2, . . . , the real-time communication API common library 193, and the real-time communication unit 181 are the same as those of one or more embodiments described above.

The application proxy unit 291 which is a function unique to one or more embodiments is executed as a task independent from the application units 701. Further, the application proxy unit 291 receives computational resources from the application units 701, and stores the received computational resources in a real-time communication request task internal-memory 293 which is a dedicated (private) storage unit provided in the corresponding task, and then transfers communication requests taken from the real-time communication request task internal-memory 293, to the real-time communication unit 181. The application proxy unit 291 has the real-time communication request task internal-memory 293 therein, and uses the real-time communication request task internal-memory 293 as an alternate means of the real-time communication request common memory 191 used in one or more embodiments described above. In other words, the application proxy unit 291 is an independent task, and the real-time communication request task internal-memory 293 is provided in a dedicated memory area for it. Therefore, other tasks (for example, the application units 701) cannot interfere with the real-time communication request task internal-memory 293 (i.e. other tasks cannot perform reading and writing). Therefore, communication requests which are stored in a buffer provided in the real-time communication request task internal-memory 293 are readable and writable only by the application proxy unit 291. Therefore, safety is ensured.

The application proxy unit 291 is configured to include a real-time communication request process library 292, the real-time communication request task internal-memory 293, and application request process units 294-1, 294-2, . . . . The application units 701-1, 701-2, . . . are also referred to simply as the "application request process units 294".

The real-time communication request process library 292 has the same function as that of the real-time communication request process common library 192 of one or more embodiments described above. In other words, the real-time communication request process library 292 receives data transmission requests and data reception requests from the application units 701, and requires the real-time communication unit 181 to perform communication processing according to those requests. However, the real-time communication request process library 292 of one or more embodiments is executed in the task of the application proxy unit 291. In other words, the real-time communication request process library 292 is not shared by a plurality of application units 701, unlike the real-time communication request process common library 192 of one or more embodiments described above. Also, the real-time communication request process library 292 accesses the real-time communication request task internal-memory 293 provided in the dedicated area (private area) for the task of the application proxy unit 291, not a memory shared by tasks. In other words, the real-time communication request process library 292 writes requests in the buffer provided in the real-time communication request task internal-memory 293, and takes requests from the same buffer.

The real-time communication request task internal-memory 293 is a memory belonging to the dedicated area for the task of the application proxy unit 291. As described above, the real-time communication request task internal-memory 293 has the buffer for temporarily storing communication requests.

The application request process units 294-1, 294-2, . . . are provided corresponding to the application units 701-1, 701-2, . . . , respectively. The application request process unit 294-1 handles transmission requests and reception requests received from the application unit 701-1, and serves as a bridge to the function of the real-time communication request process library 292. The same is true of the other application request process units 294-2, . . . . Also, the number of the application request process units 294 is arbitrary, and can be changed according to the number of application units 701.

However, a plurality of application request process units 294 may correspond to one application unit 701. In this case, for example, for each communication type or each communication direction, an application request process unit 294 may be provided. A plurality of application request process units 294 are executed in parallel, using the computational resources assigned to tasks (execution parts which are executed in parallel are generally called threads).

Between the application units 701 and the application request process units 294, and between the application request process units 294 and the real-time communication unit 181, communication requests and responses to those requests are delivered by IPC (interprocess communication).

Also, in the form shown in FIG. 7, from the real-time communication notification unit 183 of the real-time communication unit 181 to the real-time communication request process library 292, two types of notification, i.e. time notification and reception notification are performed. As a modification thereof, as for time notification, the application proxy unit 291 may set a timer in its own task, and receive a time notification at the time of timer expiration or the like. In this case, from the real-time communication notification unit 183 of the real-time communication unit 181 to the real-time communication request process library 292, only reception notification is performed, and time notification is unnecessary.

Figure 8:
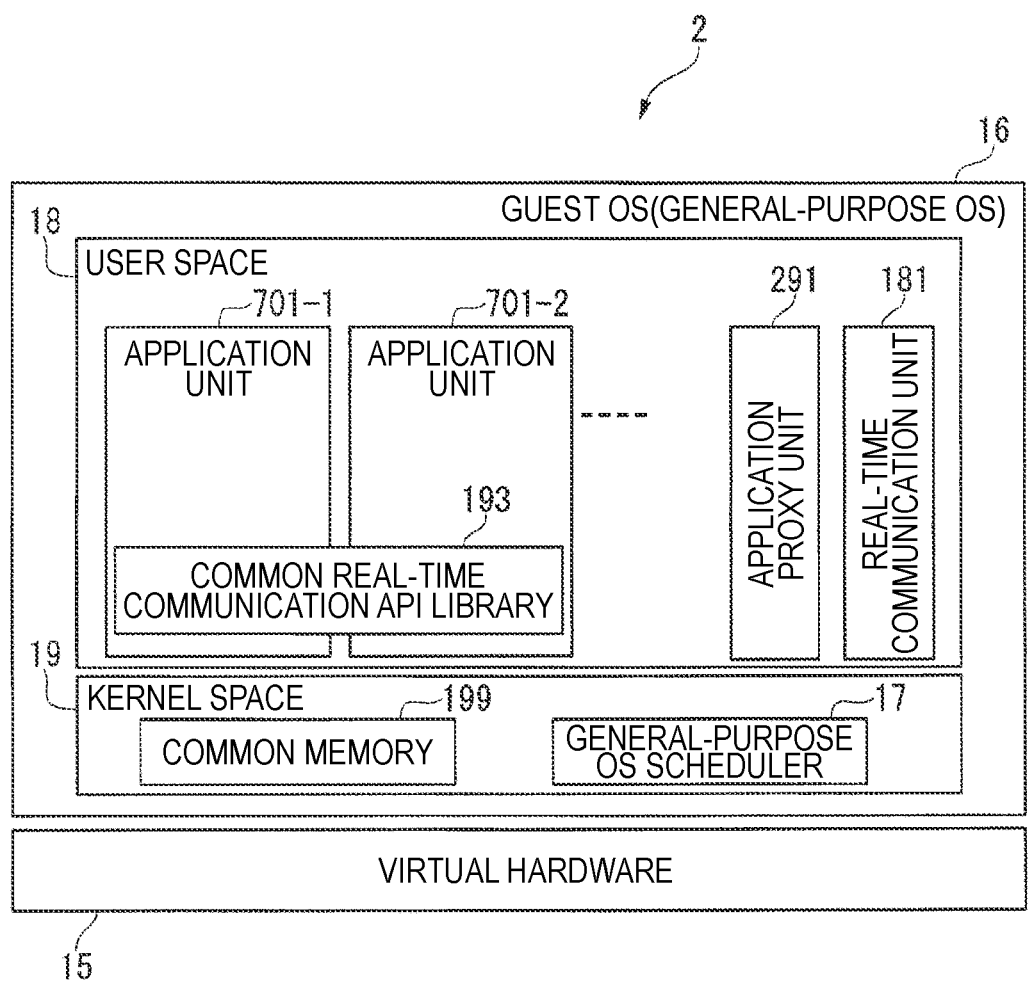
FIG. 8 is a functional block diagram illustrating some of functional components of the communication processing apparatus according to one or more embodiments.

FIG. 8 is a functional circuit block illustrating some of functional components of the communication processing apparatus according to one or more embodiments. As shown in FIG. 8, the communication processing apparatus 2 includes virtual hardware 15 which is executed on a PC, and a guest OS 16 which are executed on the virtual hardware 15. Also, the guest OS 16 may be a general-purpose OS identical to those of one or more embodiments described above. Since the method of implementing the virtual hardware 15 of one or more embodiments of the present invention is the same as that of one or more embodiments described above (see FIG. 6), here, a detailed description thereof will not be made.

The guest OS 16 has a user space 18 and a kernel space 19.

In the kernel space 19, a general-purpose OS scheduler 17 and a common memory 199 exist.

The general-purpose OS scheduler 17 schedules a plurality of tasks to be executed in the user space 18. In other words, the general-purpose OS scheduler 17 assigns computational resources to individual tasks in the user space 18. Even in one or more embodiments, the guest OS 16 is not an OS for real-time control, and the general-purpose OS scheduler 17 is not a real-time scheduler.

The common memory 199 is appropriately used in the case where there is information to be shared by tasks. In one or more embodiments, the real-time communication request task internal-memory 293 is included in the application proxy unit 291. Therefore, the common memory 199 does not need to include a storage unit for temporarily storing communication requests received from the application units 701.

In the user space 18, the application units 701-1, 701-2, . . . , the application proxy unit 291, and the real-time communication unit 181 exist.

In the application units 701-1, 701-2, . . . , the function of a library function of the real-time communication API common library 193 is incorporated. In one or more embodiments, the application proxy unit 291 is executed as a task independent from the application units 701-1, 701-2, . . . . In other words, the application units 701-1, 701-2, . . . do not include the function of the real-time communication request process common library 192, unlike one or more embodiments described above.

Also, in one or more embodiments, on the virtual hardware 15, the guest OS 16 (the general-purpose OS) is executed, and in the user space 18 of the guest OS, the application proxy unit 291 is provided. However, without a virtualizing technology, the general-purpose OS may be executed on the PC (hardware), and in the user space of the general-purpose OS, similarly to one or more embodiments, the application proxy unit may be provided.

As described above, according to one or more embodiments, frames which are delivered between the communication processing apparatus 2 and external devices are not stored in the buffer on the common memory. Instead, the buffer on the memory space in the task of the application proxy unit 291 (the buffer in the real-time communication request task internal-memory 293) is used. Therefore, it is possible to prevent a bad influence of, for example, interference between pieces of application software from occurring. In other words, it is possible to protect the applications from, for example, fear of falsifying, peeping, and so on of transmission/reception frames.

According to the embodiments described above, it is possible to implement the communication function of a communication processing apparatus for performing process control and so on. In other words, it becomes possible to implement a communication processing apparatus without any dedicated hardware. As a result, dedicated hardware is unnecessary. Therefore, it also becomes possible to implement a communication processing apparatus on a virtual PC (the virtual hardware 15). In communication for process control, real-time performance is especially important. If real-time performance is impaired by, for example, one device existing in the system, and transmission and reception of control communication are delayed, the other party in communication reacts and performs retransmission of communication. Such retransmission processing is a vain processing which the device performing the retransmission processing naturally does not need to perform. In other words, if retransmission processing occurs, the computational resources included in the system can be wasted. Also, if retransmission processing occur often, since the computational resources and the band of the communication channel are wasted, communication which naturally needs to be performed cannot be performed. As a result, the influence may spread and sequentially exert the influence not only on the device whose real-time performance was impaired first but also on other devices.

In order to prevent such sequential influence from being exerted in the system, the communication processing apparatuses are configured to satisfy the following two points.

1) Communication (frame transmission) to another device which the real-time communication unit 181 starts should not be delayed until a predetermined sequence of the communication finishes. Finish of the predetermined sequence is, for example, reception of an acknowledgement (Ack) from the other party which is the transmission destination.

2) Diagnosis communication for notifying the existence of the corresponding device (the communication processing apparatus) to other devices should not be delayed. If such diagnosis communication is delayed, at least temporarily, other devices treat the corresponding device like the corresponding device does not exist.

Also, in the embodiments, the self-diagnostic unit 185 detects unstable operations, and changes the time intervals (the pace) at which the real-time communication-unit interface 182 takes requests from the request buffer 188, in response to notification of an increase in the processing load. Therefore, the processing load of the real-time communication unit 181 is prevented from excessively increasing, and a sufficient amount of computational resources necessary for processing is assigned. Therefore, as the scheduler, the scheduler of a general-purpose OS (for example, Windows made by Microsoft Corporation) without the function of a real-time scheduler can be used. Further, even in the case, real-time performance is not impaired.

Also, to the real-time communication unit 181, a high priority is assigned.

In general, in the case where computational resources are concentrated on high-priority tasks, in order to keep the operations of low-priority tasks, general-purpose OSs allocate the computational resources of the high-priority tasks to the low-priority tasks. Unlike this case, if the computational resources of the high-priority tasks are not supplied, the real-time performance of communication processing apparatuses may not be kept. However, in the above-described embodiments, a logic which enables to assign a high priority to the real-time communication unit 181 while suppressing use of computational resources (such as the CPU usage rate) is incorporated. Therefore, even if units other than the real-time communication unit 181, such as the application units 701 and so on, try to use a large amount of computational resources, the scheduler suppresses assignment of computational resources. Due to this operation, the processing capabilities of units other than the real-time communication unit 181 decrease, but allocation of computational resources to high-priority tasks (the real-time communication unit 181) is prevented from being impaired, i.e. the computational resources of the real-time communication unit 181 are kept. Therefore, it becomes possible to maintain the real-time performance.

Also, in the case where the communication processing apparatus includes the virtualizing unit 12, even if the virtualizing unit 12 is implemented by proprietary software, communication keeping real-time performance is possible.

Also, the system can be implemented using the scheduler of a general-purpose OS, and even in this case, sufficient computational resources are allocated to the real-time communication unit 181.

Also, it is possible to implement the real-time communication unit 181, the real-time communication request process common library 192, and so on, without using device drivers. In other words, it becomes easy to develop and maintain the system (hardware).

Also, it becomes possible to perform real-time communication without always assigning CPU cores to the real-time communication unit 181.

Also, since it is possible to avoid impairment of the real-time communication performance of the communication processing apparatus, it also becomes possible to prevent the real-time communication performance of other devices included in the system from being impaired due to the influence of the communication processing apparatus.

Also, it becomes possible to implement control communication (real-time communication) having required a dedicated communication card, on general-purpose communication cards and general-purpose OSs.

Although embodiments of the present invention have been described above, the present invention can also be implemented as the following modifications.

For example, in the configuration shown in FIG. 6, the PC 11 includes only one pair of a general-purpose NIC 112 and a NIC interface 113. As a modification, the PC 11 may be configured to include a plurality of pairs of general-purpose NICs 112 and NIC interfaces 113. In other words, the PC 11 may be configured to have a plurality of communication systems capable of accessing physical (physical-layer) networks. In this case, the PC 11 may be configured to be able to perform communication using the plurality of communication systems at the same time. Also, the PC 11 may be configured such that the PC treats the plurality of communication systems as redundancy components and if a fault or the like occurs in a certain communication system, the PC performs communication using any other communication system. Also, although the number of pairs of general-purpose NICs 112 and NIC interfaces 113 in the configuration of FIG. 6 has been described above, it can be said that the same is true of the number of pairs of physical NICs 312 and NIC interfaces 313 which are included in the PC 31 of FIG. 1 and FIG. 2. In other words, the number of pairs of physical NICs 312 and NIC interfaces 313 may be one, or may be two or more.

Also, in the case of implementing the functions (or some of the functions) of each of communication processing apparatuses of the above-described embodiments and modifications of the embodiments by a program, the program for the functions is recorded in a computer-readable recording medium. In this case, the program stored in the recording medium is read and executed in a computer system. Here, the "computer system" means a system including an OS and hardware such as peripheral devices and so on. Also, the "computer-readable recording medium" means a storage device, such as a portable medium like a flexible disk, a magneto-optical disk, a ROM, a CD-ROM, a DVD-ROM, a USB memory, or the like, a hard disk which is installed in a computer system, and so on. Also, the "computer-readable recording medium" may include a medium which temporarily and dynamically holds the program, like a communication channel which is used to transmit the program via networks such as the Internet and communication lines such as phone lines, and a medium which holds the program for a predetermined time, like a volatile memory installed in a computer system which serves as a server or a client in the case of transmitting the programs. Also, the above-mentioned program may be a program for implementing some of the above-described functions, or may be a program capable of implementing the above-described functions in cooperation with programs already recorded in a computer system.

Although embodiments of the present invention have been described in detail with reference to the drawings, specific configurations are not limited to these embodiments, and include designs and so on made within the scope of the present invention.

The present invention can be applied to, for example, devices for performing real-time communication. For example, the present invention can be applied to communication processing apparatuses for managing and controlling plants and so on. However, the range of application of the present invention is not limited to the examples taken here.

According to the aforementioned embodiments, the processing load of a real-time processing unit is prevented from exceeding a predetermined level. Therefore, sufficient computational resources are given to the real-time processing unit. Therefore, processing of the real-time processing unit which should be preferentially processed are not delayed. Therefore, the real-time performance of the communication processing apparatus is secured.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A communication processing apparatus that performs communication processing in a process control system, comprising;
a processor that:
executes an application process that causes application software to be executed by the processor; and
executes a real-time communication process that causes the processor to:
receive communication requests from the application software and perform transmission and reception of data based on the communication requests;
temporarily store the communication requests received from the application software in a request buffer;
determine whether the communication requests are data transmission requests or data reception requests;
in response to determining that the temporarily stored communication requests are the data transmission requests, extract the data transmission requests from the request buffer and perform transmission processing;
execute a self-diagnostic process that detects a diagnostic index related to processing of the real time communication process, and generate a notification of operation status of the real time communication process when the diagnostic index is within a predetermined range; and
self-adjust, for the real-time communication process, time intervals for extracting the data transmission requests from the request buffer based on the notification of the operation status.

2. The communication processing apparatus according to claim 1, wherein the execution of the real-time communication process further causes the processor to adjust the time intervals for extracting the data transmission requests from the request buffer based on consecutive ones of the notification of the operation status that were generated over a predetermined time, as compared to a case where the the notification is not consecutively generated.

3. The communication processing apparatus according to claim 1, wherein the execution of the application process further causes the processor to:
cause a plurality of pieces of application software to be executed in parallel at the same time;
temporarily store the communication requests received from the plurality of pieces of application software in a real-time communication request common memory; and
transfer the communication requests extracted from the real-time communication request common memory to be used when executing the real-time communication process,
wherein the real-time communication request common memory is a storage shared by the plurality of pieces of application software.

4. The communication processing apparatus according to claim 1, wherein the processor further executes an application proxy process that causes the processor to:
receive the communication requests from the application software, wherein the application proxy process is executed independently of the application process;
temporarily store the received communication requests in a real-time communication request task internal-memory coupled to the processor; and
transfer the communication requests extracted from the real-time communication request task internal-memory to be used when executing the real-time communication process,
wherein the real-time communication request task internal-memory is a dedicated memory for the application proxy unit.

5. The communication processing apparatus according to claim 1, wherein the real-time communication process is executed, by the processor, independently of the application process.

6. The communication processing apparatus according to claim 5, wherein
the processor executes the application process and the real-time communication using a general-purpose operating system, and
the general-purpose operating system assigns resources of the processor to the application processor and the real-time communication process.

7. The communication processing apparatus according to claim 6, wherein
the general-purpose operating system is a system that is executed on virtual hardware of a computer having a virtualization unit, and
the general-purpose operating system prevents each of the resources of the processor from being shared by a plurality of pieces of the virtual hardware.

8. A computer-readable non-transitory storage medium storing a program that causes a computer to execute a process, the process comprising:
determining whether communication requests that were received from application software and are in a request buffer that temporarily stores the communication requests are data transmission requests or data reception requests;
in response to determining that the communication requests are the data transmission request, extracting the data transmission requests from the request buffer;
performing transmission processing based on the data transmission requests;
detecting a diagnostic index related to real-time communication;
generating a notification of operation status of the real-time communication when the diagnostic index is within a predetermined range; and
adjusting time intervals for extracting the data transmission requests from the request buffer based on the notification.

9. A communication processing method executed by a processor of a communication processing apparatus, the communication processing method comprising:
determining whether communication requests that were received from application software and are in a request buffer that temporarily stores the communication requests are data transmission requests or data reception requests;
in response to determining that the communication requests are data transmission requests, extracting the data transmission requests from the request buffer;
performing transmission processing based on the data transmission requests;

detecting a diagnostic index related to real-time communication;
generating a notification of operation status of the real-time communication when the diagnostic index is within a predetermined range; and
adjusting time intervals for extracting the data transmission requests from the request buffer based on the notification.

* * * * *